US012639355B2

(12) United States Patent (10) Patent No.: US 12,639,355 B2
Blum et al. (45) Date of Patent: May 26, 2026

(54) IDENTIFYING HALLUCINATIONS IN LARGE LANGUAGE MODEL OUTPUT

(71) Applicant: Microsoft Technology Licensing, LLC, Redmond, WA (US)

(72) Inventors: William Blum, Bellevue, WA (US); Amir Hossein Abdi, Gatineau (CA); Martin Fontaine, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 194 days.

(21) Appl. No.: 18/238,040

(22) Filed: Aug. 25, 2023

(65) Prior Publication Data

US 2025/0068667 A1      Feb. 27, 2025

(51) Int. Cl.
*G06F 16/34* (2019.01)
*G06F 16/334* (2025.01)
*G06F 16/338* (2019.01)

(52) U.S. Cl.
CPC ........ *G06F 16/345* (2019.01); *G06F 16/3344* (2019.01); *G06F 16/338* (2019.01)

(58) Field of Classification Search
CPC ... G06F 16/345; G06F 16/3344; G06F 16/338
See application file for complete search history.

(56) References Cited

U.S. PATENT DOCUMENTS

| | | | |
|---|---|---|---|
| 2022/0038490 A1* | 2/2022 | Thakur ................. | G06N 3/045 |
| 2023/0161972 A1* | 5/2023 | Härmä .................... | G06F 40/56 |
| | | | 704/9 |
| 2023/0237053 A1* | 7/2023 | Dangoor .......... | G06F 16/24539 |
| | | | 707/767 |
| 2023/0259705 A1* | 8/2023 | Tunstall-Pedoe .... | G06N 3/0499 |
| | | | 704/9 |

OTHER PUBLICATIONS

"Trapping LLM 'Hallucinations' Using Tagged Context Prompts", Feldman et al., Jul. 12, 2023.*
"Improving Faithfulness in Abstractive Summarization with Contrast Candidate Generation and Selection", Chen et al., 2021.*
"Dehallucinating Large Language Models Using Formal Methods Guided Iterative Prompting", Jha et al., 2023.*
"Trapping LLM 'Hallucinations' Using Tagged Context Prompts", Feldman et al., Jul. 12, 2023 (Year: 2023).*

(Continued)

*Primary Examiner* — Richemond Dorvil
*Assistant Examiner* — Adam Michael Weaver
(74) *Attorney, Agent, or Firm* — Schwegman Lundberg & Woessner, P.A.

(57) ABSTRACT

A computer-implemented method of generating verification data for a query result provided by a large language model, LLM, includes generating a prompt for the large language model. The prompt contains a verification request for a query, the query including query text and input data from which the query result can be derived. The verification request includes instructions that cause the LLM to generate verification data that indicates a derivation of the query result from the input data. Another computer-implemented method includes receiving the verification data and processing the verification data to determine whether the query result was validly derived from the input data.

12 Claims, 9 Drawing Sheets

(56) References Cited

OTHER PUBLICATIONS

International Search Report and Written Opinion received for PCT Application No. PCT/US2024/038933, mailed on Oct. 4, 2024, 15 pages.

Martino, et al., "Knowledge Injection to Counter Large Language Model (LLM) Hallucination", The Semantic Web: Eswc Satellite Events, 2023, pp. 182-185.

International Preliminary Report on Patentability (Chapter I) Issued in PCT Application No. PCT/US2024/038933, mailed on Mar. 12, 2026, 10 pages.

* cited by examiner

Figure 2:
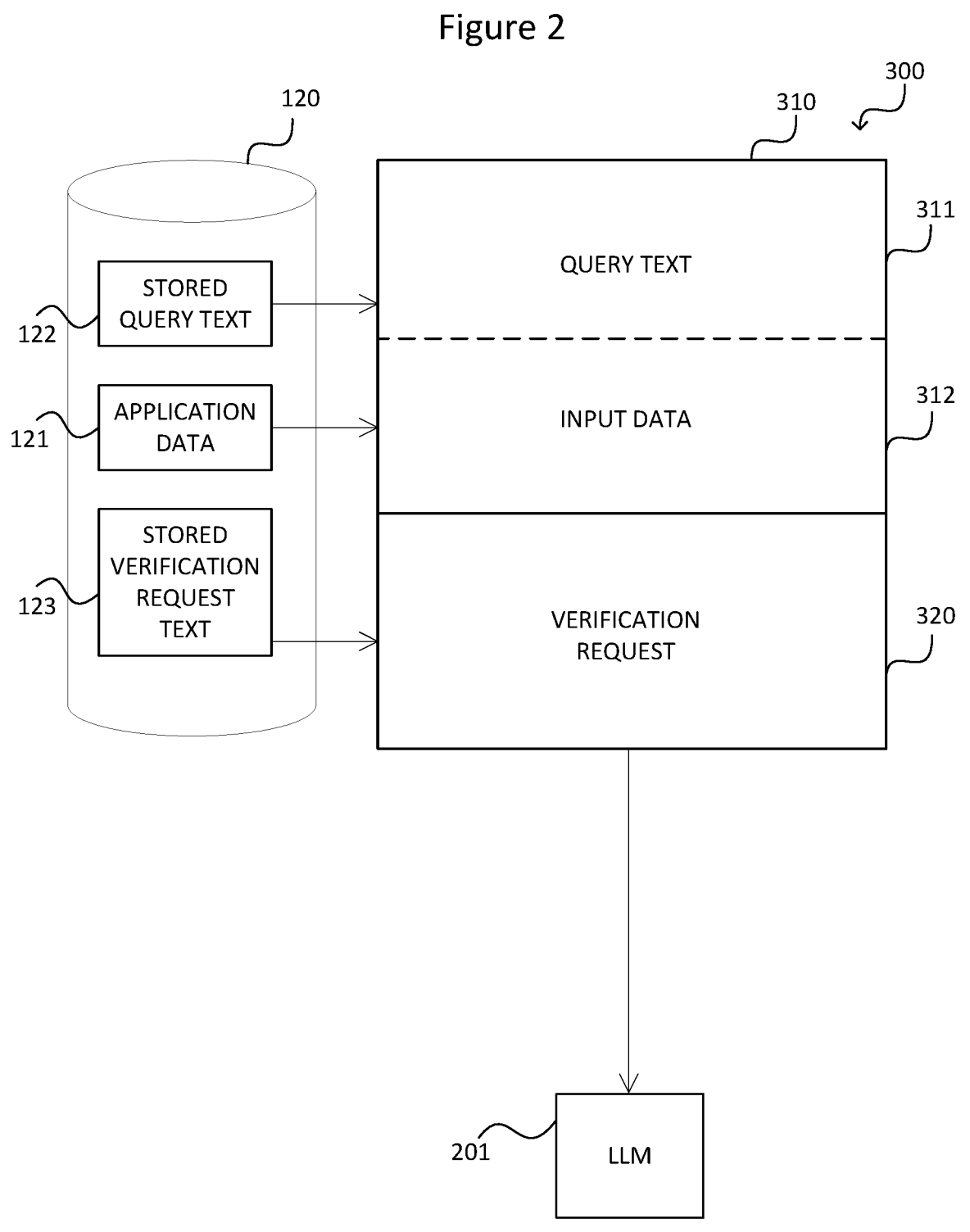

STORED QUERY TEXT

122

APPLICATION DATA

121

STORED VERIFICATION REQUEST TEXT

123

QUERY TEXT

311

INPUT DATA

312

VERIFICATION REQUEST

320

201

LLM

Summarize the following row from a Sentinel incident table

312a —

```
IncidentName,AlertId,IncidentTitle,IncidentDescription,IncidentSeverity,Incide
ntFirstTime,IncidentLastTime,TenantId,TimeGenerated,DisplayName,AlertName,Aler
tSeverity,Description,ProviderName,VendorName,VendorOriginalId,SystemAlertId,R
esourceId,SourceComputerId,AlertType,ConfidenceLevel,ConfidenceScore,IsInciden
t
```

312 —

```
f732553b-aa02-41ca-b2cf-22087fe8795d,811e5ff7-e908-a3cc-1927-
99aa5d485c84,Suspicious administrative activity,The user email@domain.com
performed more than 102 administrative activities in a single session.
Additional risks in this user session: Administrative activity was performed
in Microsoft Cloud App Security (Default). This user is an administrator in
Office 365 (Default).,Low,2023-02-27 08:01:49.734728600+00:00,2023-02-27
08:01:49.734728600+00:00,,,,,,,,,,,,,,,,,False
```

321

```
Produce a tracing table with one row for every single entity value
(e.g, process name, process Id, IP address, domain name, alert name, computer
name, device name, incident GUID,
alert GUID, timespans, timestamps, dates, user name, email address, file name,
file path, registry key, registry value name)
included in the proposed new context. Each row is defined as follows:
- 'Value': the verbatim value from the new context without any surrounding
quotes;
- 'Source': an expression that proves its traceability:
- 'MatchType': indicate the transformation that was applied to the source
value, or N/A if the
the particular piece of data from the table data was
returned verbatim with no change.
- 'SourceProofExpression': if the source is a DataTable whose name is
mentioned
in the context or results from last step, then provide here a panda
expression, referring to
that table name, that evalutes to the verbatim value. For columns containing
arrays serialized
as JSON string use the function `json.loads` to parse them. Assume python
module `json` is already imported.

Only include in the table values from the proposed new context
that were extracted (and possibly transformed) from
the goal, context or last executed step.
Do not include values that are just text content.

Return the result table in TSV format with columns: Value, Source, MatchType,
SourceProofExpression
```

322

323

320 —

324

300

| Include query text and input data in prompt | S401 |
| Include verification request in prompt | S402 |
| Input prompt to LLM | S403 |

500

| QUERY RESULT | 510 |
| VERIFICATION DATA | 520 |

A security incident with the name "Suspicious administrative activity" occurred, involving user example@domain.com. The incident has a low severity and is identified by the AlertId 811e5ff7-e908-a3cc-1927-99aa5d485c84. The incident took place on February 27, 2023, at 08:01:49 UTC. The user performed more than 102 administrative activities in a single session, which raised suspicion. Additional risks associated with this user session include administrative activity in Microsoft Cloud App Security and the user being an administrator in Office 365.

| | Value | Source | MatchType | SourceProofExpression |
|---|---|---|---|---|
| 0 | f732553b-aa02-41ca-b2cf-22087fe8795d | refa808 | | refa808.iloc[0]['IncidentName'] |
| 1 | 811e5ff7-e908-a3cc-1927-99aa5d485c84 | refa808 | | refa808.iloc[0]['AlertId'] |
| 2 | Suspicious administrative activity | refa808 | | refa808.iloc[0]['IncidentTitle'] |
| 3 | example@domain.com | refa808 | | refa808.iloc[0]['IncidentDescription'].split(' ')[3] |
| 4 | Low | refa808 | | refa808.iloc[0]['IncidentSeverity'] |
| 5 | 2023-02-27 08:01:49.734728600+00:00 | refa808 | | refa808.iloc[0]['IncidentFirstTime'] |
| 6 | Microsoft Cloud App Security | refa808 | | refa808.iloc[0]['IncidentDescription'].split(' ')[15][1:-1] |
| 7 | Office 365 | refa808 | | refa808.iloc[0]['IncidentDescription'].split(' ')[24][1:-1] |
| 8 | 102 | refa808 | | int(refa808.iloc[0]['IncidentDescription'].split(' ')[9]) |
| 9 | FALSE | refa808 | | refa808.iloc[0]['IsIncident'] |

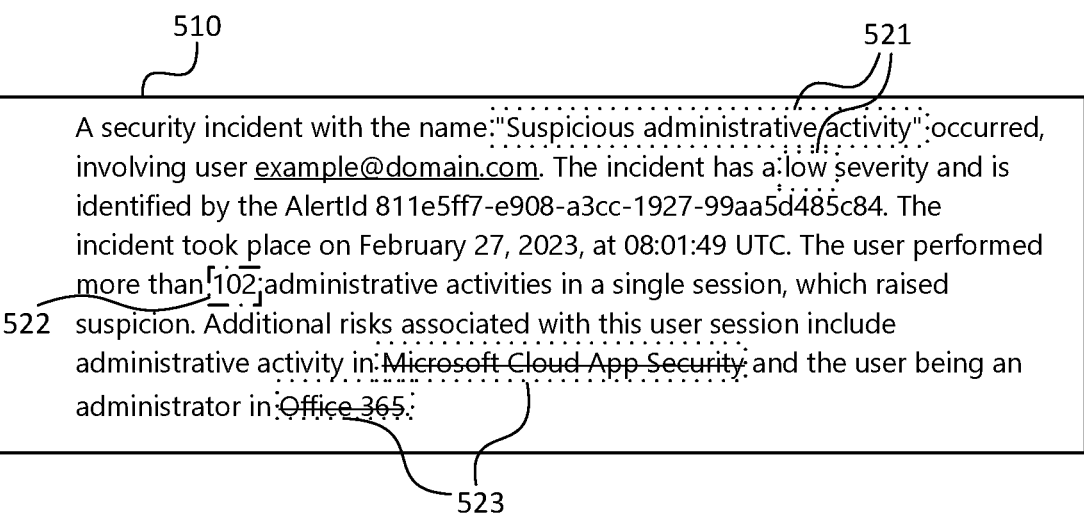

A security incident with the name: "Suspicious administrative activity" occurred, involving user example@domain.com. The incident has a low severity and is identified by the AlertId 811e5ff7-e908-a3cc-1927-99aa5d485c84. The incident took place on February 27, 2023, at 08:01:49 UTC. The user performed more than 102 administrative activities in a single session, which raised suspicion. Additional risks associated with this user session include administrative activity in Microsoft Cloud App Security and the user being an administrator in Office 365.

| TAGGED QUERY RESPONSE | 601 |
|---|---|
| Rewrite the markdown text by removing all elements that are stricken through or displayed in red. Keep the values that are in green or orange.<br>The resulting text should be proper English. | 602 |

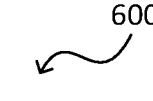

Figure 11

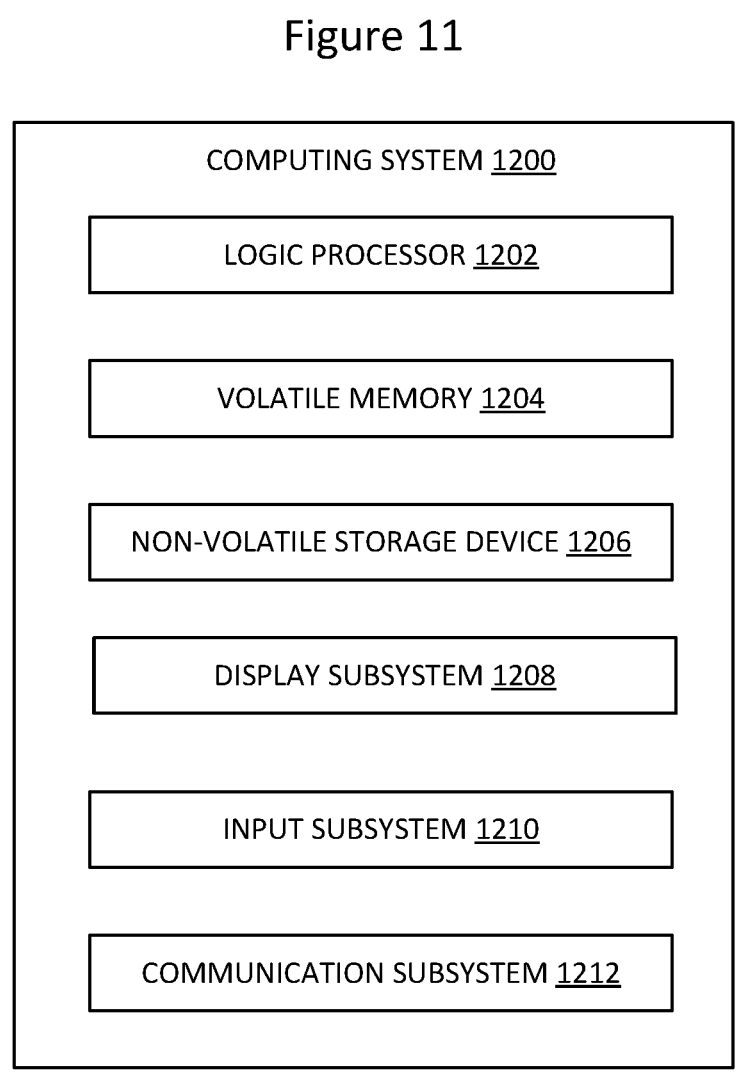

COMPUTING SYSTEM 1200

LOGIC PROCESSOR 1202

VOLATILE MEMORY 1204

NON-VOLATILE STORAGE DEVICE 1206

DISPLAY SUBSYSTEM 1208

INPUT SUBSYSTEM 1210

COMMUNICATION SUBSYSTEM 1212

IDENTIFYING HALLUCINATIONS IN LARGE LANGUAGE MODEL OUTPUT

BACKGROUND

Recently, Large Language Models (LLMs) employing a transformer architecture have been developed. LLMs are trained on a very large quantity of data, comprising a wide variety of diverse datasets. For example, GPT-3 (Generative Pre-trained Transformer 3) developed by Open AI® has 175 billion parameters and was trained on 499 billion tokens. LLMs receive textual input—referred to as a "prompt"—and generate text in response. The vast nature of the training data means that LLMs can be employed in a wide range of tasks.

It has been found that LLMs can "hallucinate". This is where the LLM provides incorrect information or invents information in response to a prompt. This is to some extent a reflection of the fact that LLMs are not structured knowledge bases, but instead are probabilistic models, which provide the most probable output. For many tasks, the vast nature of the training data means that the most probable output is also the factually correct output, but that is not necessarily guaranteed.

LLMs may be used to analyze a wide range of technical input data. For example, LLMs may be employed to summarize cybersecurity data extracted from cybersecurity databases associated with security monitoring products such as Microsoft® Defender® or Sentinel®. This may form part of a security hunting process, in which a security analyst proactively searches for threats to a computer system. In such circumstances, the LLM may hallucinate data not present in the input cybersecurity data, leading to incorrect information being provided to the security analyst.

SUMMARY

In overview, examples of the disclosure provide techniques that involve including a verification request in a prompt for an LLM. The verification request is in respect to a query, which includes query text and input data. The verification request comprises instructions which cause the LLM to generate verification data that indicates how a query result has been derived from the input data. The verification data may for example include a value present in the query result and corresponding evaluable expression.

Examples of the disclosure also provide techniques for processing the verification data received from the LLM, in order to determine whether the query result was validly derived from the input data. This may for example include evaluating the evaluable expression to produce an expression output and determining whether the expression output matches the value. If the expression output and value do not match, it is determined that the value is not validly derived from the input—i.e. the value is hallucinated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which:

FIG. 2 is a schematic diagram of an example of generating a prompt including a verification request.

FIG. 3 shows an example prompt.

FIG. 6 shows an example response including verification data.

FIG. 8 shows an example tagged query response.

FIG. 9 is a schematic representation of an example request for rectification of a query response.

FIG. 11 is a schematic block diagram of an example computing system.

DETAILED DESCRIPTION

The examples herein relate to validating the output of an LLM to identify, and optionally rectify, hallucinations. The examples involve including a request for verification data in a prompt for input to the LLM. The request for verification data causes the LLM to provide verification data that indicates how the result of an input query has been derived from input data provided to the LLM. The verification data may for example take the form of a series of expressions and associated values, the values forming the expected output of the expressions. Accordingly, the verification data forms a step-by-step record of how the query output is derived from the input data. The verification data may then be evaluated to confirm that the query result was correctly derived from the input data and is therefore not the result of a hallucination. In some examples of the disclosure, upon identifying that the query result involves a hallucination, the query can be resubmitted with a request for correction.

The techniques may be employed in the analysis of input data in various technical contexts. For example, the input data may be cybersecurity data, medical or healthcare data, or data output by various types of industrial machinery.

Figure 1:
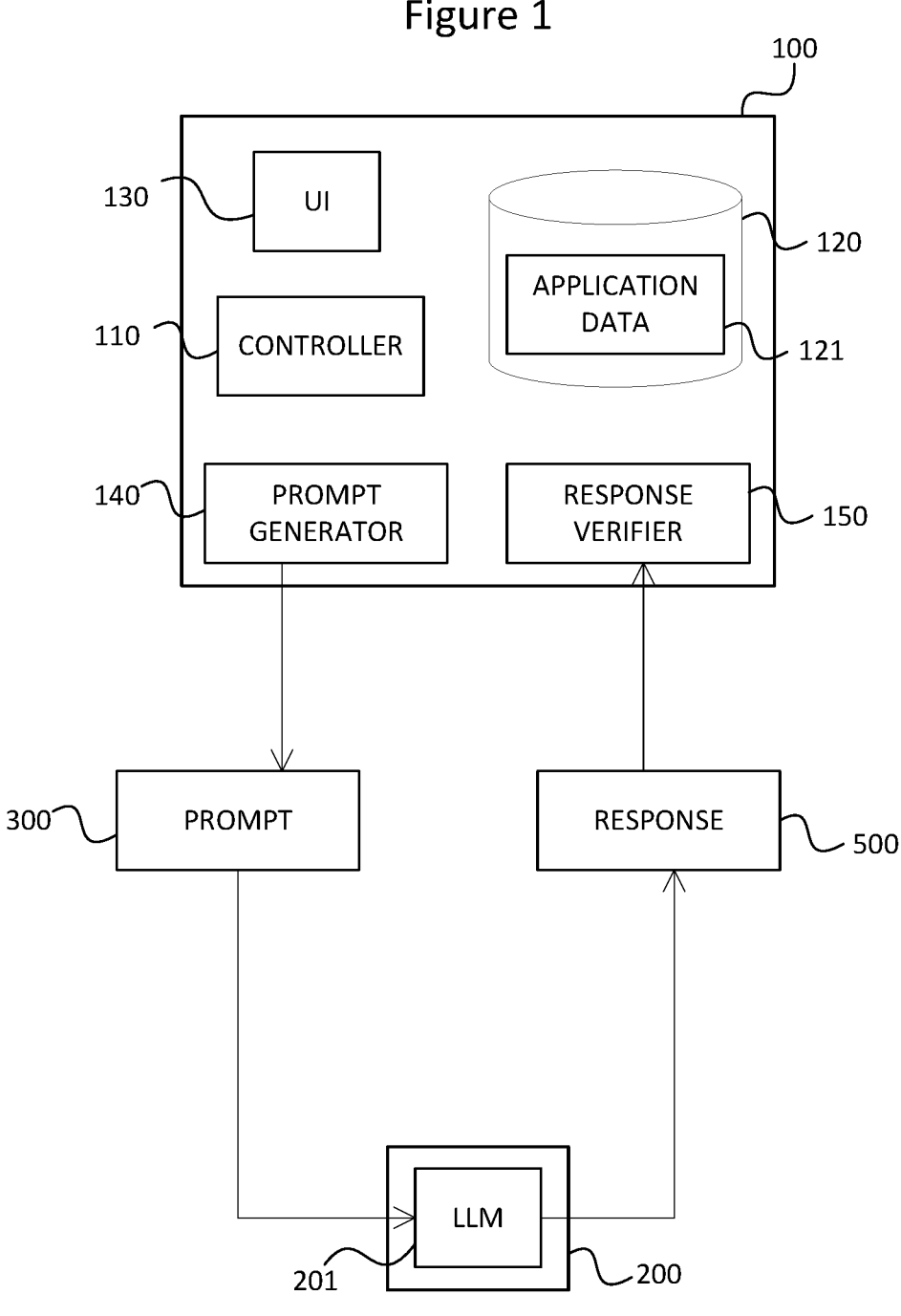
FIG. 1 is a schematic block diagram of an example computing environment including an example system according to the disclosure.

FIG. 1 illustrates an example environment 1 in which examples of the disclosure may operate.

The environment 1 includes a large language model (LLM) 201. The LLM 201 is a trained language model, based on the transformer deep learning network. The LLM 201 is trained on a very large corpus (e.g. in the order of billions of tokens), and is a generative model that can generate text or data in response to receipt of a prompt.

An example of a suitable LLM 201 is the Open AI General Pretrained Transformer (GPT) model, for example GPT-3 or GPT-4. However, a variety of LLMs 201 may be employed in the alternative.

The LLM 201 operates in a suitable computer system 200. For example, the LLM 201 is stored in a suitable data centre, and/or as part of a cloud computing environment or other distributed environment. The LLM 201 is accessible via suitable APIs, for example over a network. The network may comprise any suitable links, including wired and wireless links and local and wide area networks.

The environment 1 also includes a computer system 100. The computer system 100 is configured to interact with the LLM 201. The system 100 is configured to generate suitable prompts 300 using prompt generator 140 and submit them to the LLM 201 over the network. In addition, the system 100 is configured to receive a response 500 (also referred to as a "completion") from the LLM 201. The response includes verification data, and the system 100 is further configured to process the verification using response verifier 150.

The computer system 100 also includes a controller 110 and a storage 120. The controller 110 includes a processor or other compute unit configured to execute instructions stored in the storage 120, to carry out the operations and processes discussed in further detail herein. The storage 120 may include volatile and non-volatile memory. The system 100 may also further include a suitable user interface 130.

In the examples that are discussed with respect to FIGS. 2 to 10, the computer system 100 is a security system. That is to say the computer system 100 is configured to prevent or detect cybersecurity threats. The computer system 100 may for example comprise suitable cybersecurity software, such as Microsoft® Defender® or Sentinel®. As such, the storage 120 may store application data 121 in the form of one or more databases associated with the cybersecurity software. The databases may store information generated by the cybersecurity software. For example, the database may include tables storing cybersecurity incidents, details of users and permissions, records of accesses of certain resources of the system etc. Although as described FIG. 1 is a security system, it may equally be a system that accesses remotely hosted (e.g. cloud hosted) security software.

It will be understood that the disclosure is not limited to security systems, and various other applications of the techniques discussed herein are envisaged, a selection of which are discussed further below.

FIG. 2 schematically illustrates a process of constructing a prompt 300 for submission to the LLM 201. In general, the process includes inserting (also referred to as injecting) information into the prompt 300 that causes the LLM 201 to return verification data.

The prompt 300 comprises a first part 310, which includes query text 311 and input data 312. The query text 311 prompts the LLM 201 to provide a query result, wherein the result is derived from the input data 312. The combination of query text 311 and input data 312 may be referred to herein as the query.

The query text 311 may be predetermined text, stored in storage 120. For example, the system 100 may select amongst one of a plurality of predetermined query texts 122 depending upon circumstance or in response to a particular user input. In this context, the query text 311 is for example a task or instruction for the LLM 201 to carry out. The query text 311 be in the form of a question to be answered by the LLM 201. The query text 311 is in the form of natural language, rather than in terms of a query expressed in a structured query language such as SQL, KOL or the like. It can therefore also be termed an instruction text.

The input data 312 is the data upon which the LLM 201 bases its analysis to answer the query expressed in the query text 311. The input data 312 may be structured data. For example, the data may be tabular data extracted from one or more database tables. However, the input data 312 may be other types of structured data (e.g. dictionaries, lists, parse trees, source code, etc), or in some instances unstructured data.

The input data 312 may be derived from the application data 121. For example, the input data 312 may be a row extracted from an incident table of a database associated with security software. The system 100 may accordingly be able to query the application data 121 (e.g. using a query language such as SQL or Kusto Query Language) to retrieve the input data 312.

The first part 310 of the prompt 300 effectively corresponds to a normal input query for the LLM 201, in which analysis of input data 312 is required.

The second part 320 is a verification request. The verification request 320 prompts the LLM 201 to provide verification data. That is to say the verification request 320 is a set of instructions included in the prompt that guide the LLM 201 into generating the verification data. In this context, instructions refers to natural language instructions (e.g. in English) that can be received as input by the LLM 201 and processed thereby, rather than machine-readable instructions. The verification request 320 may also be based on stored template text 123. In some circumstances, the storage 120 stores a plurality of verification request texts 123, and the system 100 selects from amongst the stored texts 123. For example, different query texts 311 and/or different types of input data 312 (as discussed in more detail below) may have different associated verification request texts 123.

The verification data is data that can be analyzed to determine that the query result has been validly determined from the input data. The returned verification data for example takes the form of a trace, detailing a sequence of operations carried out to derive the query result from the input data. As discussed further below, the verification data may take the form of a tracing table.

The prompt 300 may include further elements beyond those discussed above. For example, the prompt 300 may include a header and/or footer or additional elements inserted between the first part and second part. These may provide additional instructions or information useful in ensuring that the LLM 201 appropriately responds to the prompt 300.

The process of constructing (or generate) the prompt 300 may include retrieving one or more strings from the storage 120, such as the above-mentioned query text 311, the verification request 320 and/or the further elements such as headers or footers. It may also comprise generating one or more strings, for example by converting data extracted from the storage 120 (e.g. application data 121) into strings. The resulting strings can then be concatenated or otherwise combined to form the prompt 300. For example, each string may be loaded into memory, and combined to form a larger string comprising the prompt 300. The prompt 300 is then stored in memory (e.g. in volatile memory) before being transmitted to the LLM 201, e.g. via an API call.

FIG. 3 shows the example prompt 300 in more detail. In the example of FIG. 3, the prompt 300 is for summarizing a row of tabular data generated by a security system. Accordingly, the query text 311 begins "Summarize the following row from . . . " before indicating the nature of the table ("a Sentinel incident table").

The input data 312 then takes the form of the row of the table, in comma-separated value format. In this example, the input data 312 also includes a schema 312a (i.e. a table header) listing the names of the columns appearing in the input data 312.

The verification request 320 takes the form of a set of instructions that prompt the LLM 201 to provide the verification data. The verification request 320 includes a table structure instruction 321 to produce a tracing table which includes a row for each entity value.

In terms of the content of the tracing table, the verification request 320 includes instructions 322 that cause a column of the tracing table to be populated with values. The values are values that will appear in the query result. In the example, the instruction is to provide the verbatim value from the new context (i.e. from the query response), without surrounding quotes.

The verification request 320 further includes instructions 323 that cause the tracing table to be populated with a column including a source for each value. The source will indicate the part of the input data 312 (e.g. a table name) from which the value has been derived.

The verification request 320 also includes instructions 324 that cause the tracing table to be populated with a column including an expression for each value. The expression is evaluable, and thus indicates how the value was derived from the input data 312. If the values have not been hallucinated, the output of the evaluated expression should match the corresponding value. This may be a literal match, or a fuzzy match as discussed in more detail below. Each expressions can be considered proof, in the sense that it is a calculation or other set of computational operations that can be carried out to demonstrate how the value was derived.

In the example, the expressions are Python® expressions. Consequently, each expression is effectively a code snippet that can be executed in a suitable Python environment to provide the output. Particularly, the expressions are pandas expressions. Pandas (https://pandas.pydata.org/) is a Python library for data analysis and manipulation of tabular data. The expressions may also comprise JSON query expressions.

Figure 4:
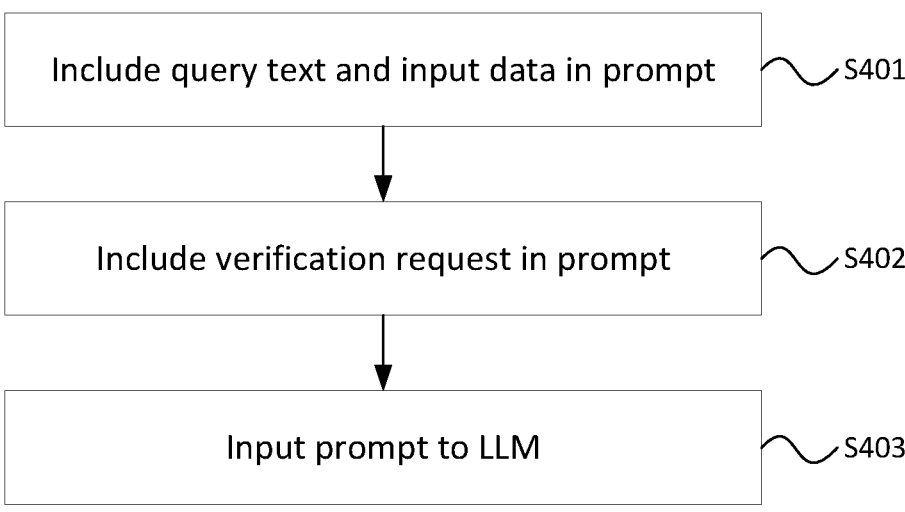
FIG. 4 is a schematic flowchart of a method of generating a prompt including a verification request.

FIG. 4 illustrates a method of generating verification data. As discussed above, this may be carried out by the prompt generator 140. The method includes a step S401 of including query text and input data in a prompt. The query text, when processed by the LLM 201, causes the LLM 201 to provide a query result based on the input data. The method also includes a step S402 of including a verification request in the prompt. In step S403, the generated prompt is input to the LLM 201, causing the LLM 201 to generate a response.

Figure 5:
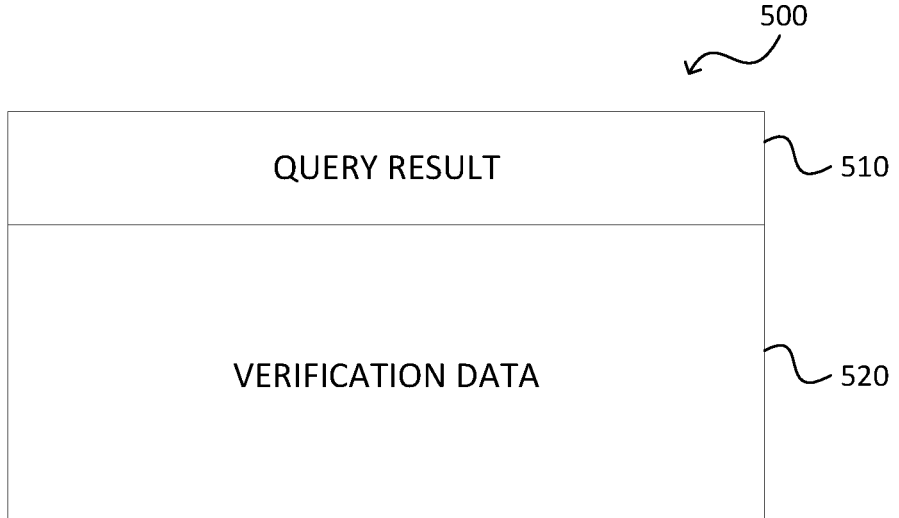
FIG. 5 is a schematic representation of a response including verification data.

Turning to FIGS. 5 and 6, there now follows a description of the response or completion 500 generated by the LLM 201. In general, the response comprises two parts 510, 520, which are respectively responsive to the first part 310 and second part 320 of the prompt 300. That is to say, the response comprises a first part 510 that contains the response to the query 310. The response also comprises a second part 520 that includes the verification data generated by the LLM 201 in response to the verification data request 320.

FIG. 6 shows the response 500 in more detail. In the example shown, the response 500 is specifically responsive to prompt 300 shown in detail in FIG. 3. The query result 510 in this example is therefore a summary of the security incident detailed in the input data 312. The summary reads as follows:

"A security incident with the name "Suspicious administrative activity" occurred, involving user example@domain.com. The incident has a low severity and is identified by the AlertId 811e5ff7-e908-a3cc-1927-99aa5d485c84. The incident took place on Feb. 27, 2023, at 08:01:49 UTC. The user performed more than 102 administrative activities in a single session, which raised suspicion. Additional risks associated with this user session include administrative activity in Microsoft Cloud App Security and the user being an administrator in Office 365.".

The verification data 520 takes the form specified in the verification request 320. That is to say, the verification data 520 comprises a tracing table having the columns discussed above with respect to FIG. 3. For simplicity, the verification data 520 is shown as a table, rather than the tab-separated values that would be returned by the LLM 201 in line with the instructions in the verification request 320.

In terms of the expressions, a number of the expressions 521 are references to elements in the input data 312. However, some of the expressions 522 are more complex and involve selecting parts (e.g. substrings) of elements of the input data 312, or apply string splitting operations thereto. In further examples, the expressions may be more complex, including any of the counting of rows in the input data, the filtering of the input data, the aggregation of the input data, the reformatting of the input data and so on.

Figure 7:
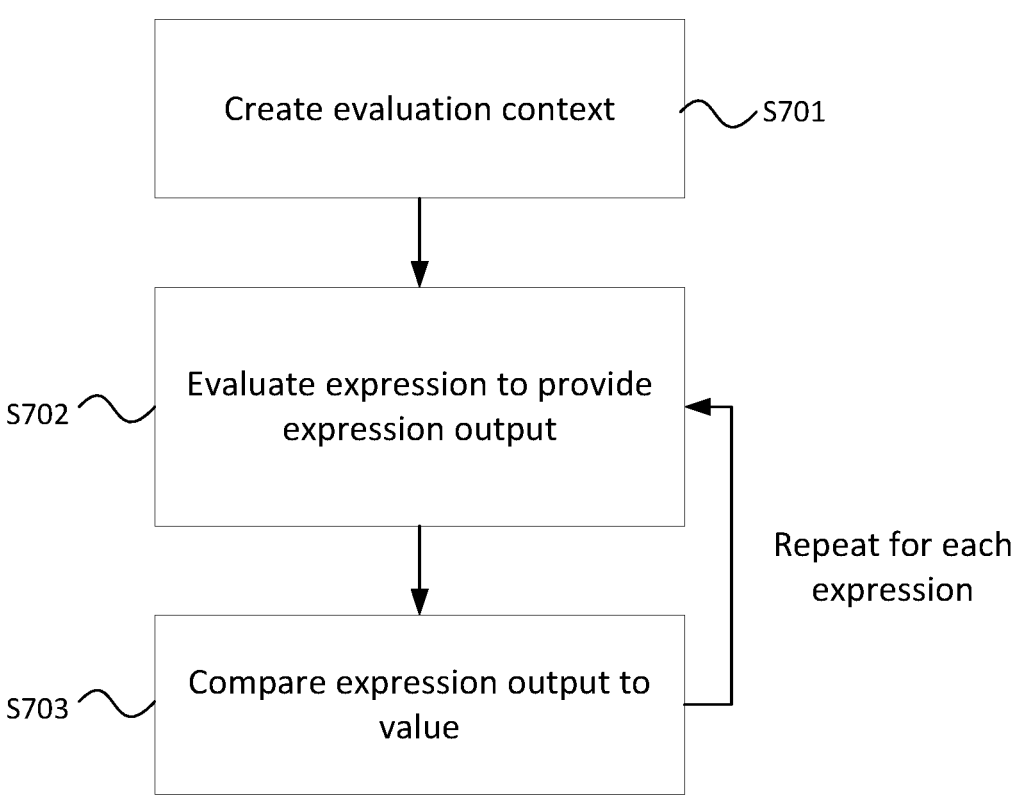
FIG. 7 is a schematic flowchart of a method of processing verification data.

FIG. 7 illustrates a method of processing the verification data to determine whether the query result 510 comprises a hallucination. In general, the method involves processing each row of the table to evaluate the expression therein, and determining whether it matches the value in the row. The method may be carried out by the response verifier 150 of system 100.

The method initially involves a step S701 of creating or instantiating a suitable evaluation context in which the expressions may be evaluated. This involves loading any suitable contextual data into memory of the system. For example, where the input data 312 is tabular, a data table may be instantiated comprising the input data 312. The pandas library discussed above may be employed for this purpose, with the input data being instantiated as a pandas DataFrame.

In more detail, the source column of the table indicates which part (e.g. which table in the event that data from multiple tables is provided) of the input data 312 the value is derived from. Accordingly, the source column may be used to select tables to include in the evaluation context. For example, "refa808" mentioned in the source column and in the expressions is a table (e.g. a pandas DataFrame) in memory forming part of the evaluation context.

Depending on the circumstances, creating the evaluation context may also include loading other data, such as other database tables, into memory in a similar manner. It can also involve loading one or more software libraries that are used in evaluating the expression.

Subsequently, in step S702 the expression comprised in a row of the table is evaluated. The evaluation of the expression provides an expression output.

Where the expression is a Python code snippet, this step can comprise calling Python's built-in eval function, which evaluates input text as a Python expression.

The use of the pandas Python library to evaluate the expressions enables the expressions to make use of the pandas query language, which includes query, filtering, aggregating, grouping, indexing etc in addition to JSON parsing. This allows the system 100 to verify elements in the output that are not necessarily occurring in the original input. For instance, the LLM 201 may have concatenated a value from a column "username" with another one called "domain_name" to form an email address that is not literally present in the prompt 300 but present in its completion 500. Other situations that may not be supported without supporting a query language like pandas in the expression include counting rows in a table, or estimating an average time between alerts of an incident.

In some examples it may be undesirable for security reasons to execute arbitrary code using eval. Accordingly, to obviate such issues, the expression may be evaluated in a suitably isolated computational environment. For example, the evaluation may take place in a sandboxed environment. For example, the expression may be evaluated in an isolated operating system process or hypervisor, or in a locked-down container (e.g. a Docker® container). Alternatively, the PyPy Python implementation may be used to evaluate the expression in a sandboxed manner. Further alternatives include implementing a custom parser that evaluates the expression without use of eval, or using expressions in another language (e.g. using Excel as a query expression language).

In step S703, the expression output is compared to the corresponding value in the row. If comparison reveals that the expression output and the corresponding value match, the value is valid. That is to say, if the expression output and value match, the value is not hallucinated. Conversely, if the expression output and value do not match, the value is determined to be hallucinated.

In some examples, determining that the expression output and corresponding value match comprises a comparison (e.g. a string comparison) to determine that they are identical. However, more complex matching techniques can also be applied. For example, a comparison may be applied that takes account of different data formats (e.g. different date or time formats).

A fuzzy comparison can also be carried out. The fuzzy comparison can return three values: equal, not equal and approximately equal. The approximately equal value covers the case that the expression output and corresponding value are not exact matches, but are sufficiently similar for it to be deemed that the value is not hallucinated. For example, the fuzzy comparison may return approximately equal if the values are dates or times within a predetermined tolerance, or if the values are strings within a predetermined edit distance. The edit distance may be normalized by the length of the strings.

In some examples, if the comparison in step S703 returns not equal, the method may also involve searching the indicated source for strings that match the value, to determine whether the value is included in the input data.

As illustrated, the steps S702, S703 are carried out for each expression in the tracing table, so as to identify whether any of the values in the query result 510 are hallucinated. The step S701 may also be repeated where a different evaluation context is required for a row of the table.

The output of the comparisons may be stored in any suitable data structure. For example, the system 100 may generate a verification table, with a similar structure to the tracing table but with additional columns storing the expression output and the result of the comparison. The verification table may also include a column indicating an error message returned in the event that the expression failed to evaluate in step S702.

The output of the comparisons (e.g. the verification table) may then be employed to label the query result 510. That is to say, having determined which values in the result 510 are valid and which are hallucinated, the occurrences of these values in the text of the result 510 may be tagged or labelled accordingly. For example, metadata may be generated that indicates which parts of the query text are valid, hallucinated or were unable to be verified because the expression failed to evaluate.

In some examples, the labels are used to display the query response in a manner that highlights valid values, hallucinated values and values that were unable to be verified. For example, the labels may be employed to generate formatted HTML, which is then displayed to the user via UI 130.

FIG. 8 shows an example of a tagged version of query result 510, based on the verification data 520. Elements 521-523 of the query result 510 can be displayed in different colours to indicate their validity. The elements 521 are shown in green, to indicate that they are valid. The element 522 is shown in orange, to indicate the expression did not evaluate. The elements 523 are shown in red and strike-through, to indicate that they are hallucinated. It will be understood that the black and white figure does not permit these colours to be shown, and thus the relevant elements are highlighted with different dashed and dotted lines instead. It will be appreciated that the colours and formatting discussed are merely examples, and any other suitable formatting for highlighting the values in the query according to the output of the comparisons may be applied.

In the event that the processing of the verification data 520 results in a determination that the query result 510 comprises hallucinated data, the system 100 may take steps to rectify the query response. That is to say, having identified that the result 510 comprises hallucinated data, the system 100 may dissipate (i.e. remove) the hallucinations from the result 510.

FIG. 9 Illustrates one approach for removing the hallucinations. In this approach, the system 100 generates a prompt 600 that includes the query response 601, tagged with the labels discussed in relation to FIG. 8 above. The prompt furthermore comprises instructions 602 to rewrite the query response without the elements that correspond to hallucinations. Upon submitting the prompt 600, the LLM 201 returns a response omitting the hallucinations. This is a relatively straightforward approach that can be readily employed where the task at hand is textual summarisation and simply omitting the hallucinated information will still result in a useful response.

An alternative approach is to construct a prompt comprising the verification table and the query result 510, wherein the prompt requests the LLM 201 to regenerate the result 510 and verification data 520 without including the hallucinated values. The prompt therefore effectively indicates values that could not be derived from the input data. The response to this prompt can then be processed as set out above with reference to FIG. 7. If the response still includes hallucinations, the process can be repeated until a convergence criterion is met, such as a certain percentage of values in the output being verified.

Figure 10:
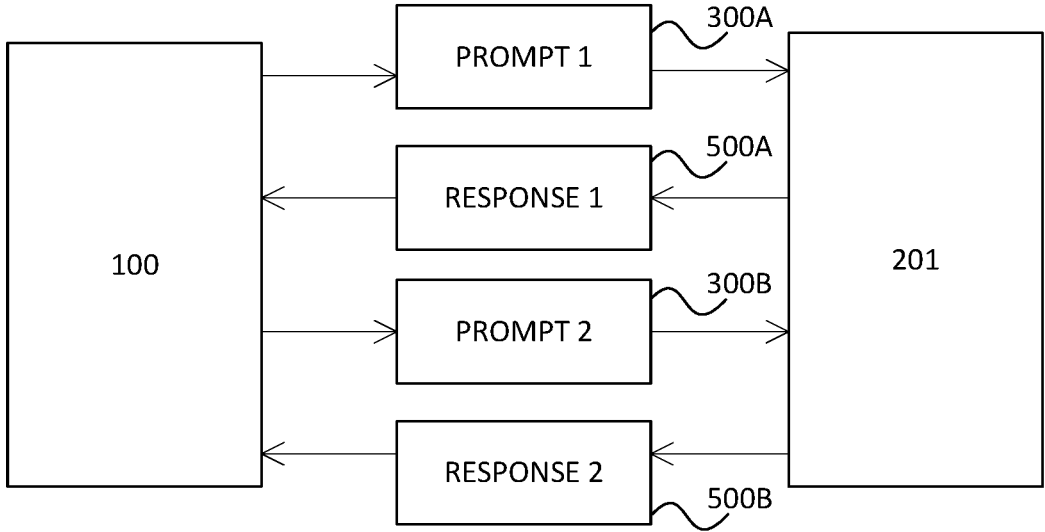
FIG. 10 is a schematic block diagram of another example computing environment including another example system according to the disclosure.

FIG. 10 illustrates another example of the disclosure. In the preceding discussion, the request for verification is injected into the prompt comprising the query text. However, this need not be the case. Instead, in FIG. 10, the system 100 generates a first prompt 300A that includes the query text and the input data, and a second prompt 300B which includes the verification request. These each result in a respective response 500A, 500B.

Whilst the approach of injecting verification requests can be advantageous in circumstances where it is desirable to limit the number of API calls made to the LLM (e.g. to reduce network traffic or to avoid reaching limits instituted by the host of the LLM), in circumstances where such constraints do not apply, supplying two prompts may be preferable. For example, this approach can reduce the likelihood of the LLM 201 leaking the verification data 520 into the query result 510, whereupon it may be viewed by the user.

The approach of FIG. 10 may be particularly suited to examples in which the LLM supports chat-based completion, such as ChatGPT. Chat-based completion retains context between prompts submitted during a session. That is to say, each prompt is not processed in isolation but is processed in a manner that takes into account any previous prompts received by the LLM from the user during the session.

In other examples, the query text and input data may also be supplied in separate prompts. For example, it may be the case that a query text is supplied in a first prompt, and then subsequent prompts provide different input data (e.g. different batches of data) to be processed based on the same query text.

The examples of FIGS. 2 to 10 illustrate the application of the techniques of this disclosure to a cyber security context. Particularly, the techniques are applied to summarize structured data in the context of augmenting or guiding a security analyst conducting an incident investigation or carrying out threat hunting using a suitable tool. As discussed, the input data may result from executing a KQL query (Kusto Query Language), or an equivalent query language such as Splunk, to pull log records from a security system like Azure® Sentinel® or Microsoft® Defender®. However, it will be understood that this is merely an example.

For example, the techniques may be applied to different scenarios in the context of cyber security. In one example, the techniques may be applied to the generation of queries (e.g. in KQL or another suitable query language) from user input such as a chat session. For example, the LLM can be used to generate a query expression to fetch security logs. When doing so as part of an investigation, the system can ensure the entity values used in the filtering clauses (e.g., computer name, user name, IP addresses) are relevant to the investigation and are not hallucinated. In another example, the techniques may be applied to queries for question answering from log tables (e.g. IP traffic tables or process execution tables), reverse engineering questions from source code, Common Vulnerabilities and Exposures (CVE) metadata summarization, reverse engineering of Windows Registry key settings or Group Policy Object files, or the pruning of investigation branches in a tree-based guided investigation system.

The techniques may be applied in other domains. For example, the techniques may be employed in summarization or in question answering relating to structured data including sensor data. For example, various sensors are often installed in industrial machinery, production lines, vehicles, aircraft etc and may result in the generation of large quantities of structured data. In other examples, the techniques may be applied to healthcare records or other medical data including data generated by wearable devices, sensors, medical scanners or other diagnostic or treatment equipment and the like. More generally, it will be understood that summarization is only one possible task, and the query may prompt the LLM in relation to task such as question answering, entity extraction or information retrieval.

Various modifications may be made to the examples discussed herein within the scope of the disclosure. Whilst the examples above illustrate that the same computer system 100 generates the prompt including the verification data and then subsequently processes the returned verification data, this need not be the case. In other examples, different computer systems may generate the prompt and process the returned verification data.

In the examples above, the input data is tabular data, for example extracted from databases, in pandas format. The expressions can then also be pandas expressions. However, a wide variety of input data and corresponding query languages for the expressions may be implemented. For example, in respect of tabular data Excel® formulas could be used as the expressions or JSON query expressions could be used. An example of another structured input data format is XML, for example with corresponding XPATH expressions. Other examples include code in a suitable domain-specific language (DSL) with expressions being snippets of the code to be parsed by an interpreter, or an abstract syntax tree with corresponding parser.

Still further, the input data may be text (e.g. CVE information in raw text), with the expressions being locations in the text (e.g. line numbers, paragraph numbers, numbered sections etc) where the values are found. The expression language could alternatively be based on a text tokenizer. In further examples, the input data could be a hex dump of an executable binary, with the expressions based on disassembly or decompilation of the corresponding parts of the input data.

Although the examples above involve verification data in the form of a tracing table, it would be understood that this is only one means of formatting the verification data. Any suitable means of returning values contained in the query response and associated evaluable expressions may be provided.

Advantageously, the techniques herein provide a means of accurately identifying hallucinations in LLM output. This ensures the user is provided with accurate responses to factual queries. Furthermore, the techniques leverage the LLM itself to generate the necessary verification data—essentially prompting the LLM to show its working. The techniques can furthermore be applied in a manner that is transparent to the end user, with the system automatically injecting the verification request into a prompt generated or selected by a user.

In addition, the techniques herein provide means of conveniently revising the query result using the LLM to remove hallucinated data. The inventors have also found that including a verification request in the prompt can itself reduce the likelihood that the query result comprises hallucinated data.

FIG. 11 schematically shows a non-limiting example of a computing system 1200 that can enact one or more of the methods and processes described above. Computing system 1200 is shown in simplified form. Computing system 1200 may embody any of the computer devices 100 or 200 described above and illustrated in FIGS. 1-2, or any other computer device discussed herein. Computing system 1200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 12.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e g., CD, DVD, HD-DVD, Blu-Ray Disc, etc), semiconductor memory (e g., ROM, EPROM, EEPROM, FLASH memory, etc.), and/or magnetic memory (e.g., hard-disk drive), or other mass storage device technology. Non volatile storage device 1206 may include nonvolatile, dynamic, static, read/ write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1200 typically implemented in software by a processor to perform a particular function using portions of volatile memory, which function involves transformative processing that specially configures the processor to perform the function. Thus, a module, program, or engine may be instantiated via logic processor 1202 executing instructions held by non-volatile storage device 1206, using portions of volatile memory 1204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1208 may be used to present a visual representation of data held by non-volatile storage device 1206. The visual representation may take the form of a graphical user interface (GUI). Because the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1200 to send and/or receive messages to and/or from other devices via a network such as the internet.

Additional example features of the disclosure are set out below.

According to a first aspect of the disclosure, there is provided a computer-implemented method of generating verification data for a query result provided by a large language model, LLM, in response to a query including input data from which the query result was derived, the method comprising: generating a prompt for the large language model, LLM, the prompt including: a verification request for the query result, wherein the verification request comprises instructions which, when processed by the LLM, cause the LLM to generate verification data that indicates a derivation of the query result from the input data, and providing the prompt as input to the LLM.

Generating the prompt may comprise selecting a stored verification request text. The stored verification request may be selected from a plurality of stored verification request texts, suitably based on the query.

The input data may be structured data. The structured data may be tabular data.

Generating the prompt may include retrieving a stored query text. Generating the prompt may include generating the input data based on data extracted from a data store.

Generating the prompt may include combining the stored query text, the input data and the verification request.

The prompt may be a second prompt. The method may further comprise, prior to generating the second prompt: generating a first prompt for the LLM, the first prompt including the query; and providing the first prompt as input to the LLM to cause the LLM to generate the query result.

The verification data may comprise a value included in the query result and a corresponding evaluable expression for deriving the value included in the query result from the input data.

The method may comprise extracting the input data from a data store suitably associated with a security system.

The query may include query text comprising instructions which, when processed by the LLM, cause the LLM to summarise the input data. The query may alternatively or additionally include query text comprising instructions which, when processed by the LLM, cause the LLM to answer questions in respect of the input data or perform entity extraction on the input data.

The optional features defined above in relation to the first aspect may be combined in any combination. Accordingly, each sentence in the optional features defined above can be read as if it is a dependent claim referring to the features of any preceding sentence.

According to a second aspect, there is provided a computer-implemented method of verifying a query result output by a large language model, LLM, in response to a query including input data from which the query result was derived, the method comprising: receiving verification data generated by the LLM in response to a prompt including a verification request, wherein the verification data indicates a derivation of the query result from the input data; and processing the verification data to determine whether the query result was validly derived from the input data.

The verification data may comprise a value included in the query result. The verification data may comprise a corresponding evaluable expression for deriving the value included in the query result from the input data. Processing the verification data may comprise: evaluating the evaluable expression to provide an expression output; comparing the expression output to the value included in the query result; and in response to the expression output matching the value included in the query result, determining that the value was validly derived from the input data.

Processing the verification data may comprise: instantiating an evaluation context; and evaluating the evaluable expression in the evaluation context to provide the expression output. Instantiating the evaluation context may include loading at least part of the input data into memory. Evaluating the evaluable expression may be carried out in an isolated computational environment.

The method may comprise displaying, on a user interface, the query result. The method may comprise highlighting the value included in the query result according to an output of the comparing the expression output to the value.

The method may comprise, in response to the expression output not matching the value included in the query result, generating a tagged query result including a tag indicating that the value is hallucinated. The method may comprise generating a prompt including the tagged query result and instructions that, when processed by the LLM, cause the LLM to rewrite the query result with the value omitted. The method may comprise inputting the prompt to the LLM; and receiving in response a rewritten query result omitting the value.

The method may comprise, in response to the expression output not matching the value included in the query result, generating a prompt including one or more of: the query result; the evaluable expression; the value included in the query result; an indication that the value could not be derived from the input data, and instructions that, when processed by the LLM, cause the LLM to generate a corrected query result.

The optional features defined above in relation to the second aspect may be combined in any combination. Accordingly, each sentence in the optional features defined above can be read as if it is a dependent claim referring to the features of any preceding sentence.

Furthermore, the method of the first aspect and the method of the second aspect may be combined. In other words, the disclosure extends to methods in which verification data is generated and verified.

According to another aspect of the disclosure there is provided a computer system comprising a processor and a memory, the memory storing instructions, which when executed by the processor, cause the system to carry out any of the methods defined herein.

According to another aspect of the disclosure there is provided a tangible non-transient computer-readable storage medium having recorded thereon instructions which, when executed by a computer device, cause the computer device to perform any of the methods set forth herein.

According to another aspect of the disclosure there is provided a computer program product comprising instructions which, when executed by the testing apparatus of the first aspect, cause the computer device to perform any of the methods set forth herein.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A computer-implemented method of verifying a query result provided by a large language model, LLM, in response to a query including input data from which the query result was derived, the method comprising executing, by a computer processor, stored processor-executable instructions to perform operation comprising:

automatically injecting, into a prompt including query text and the input data, a verification request for the query result, wherein the verification request comprises instructions which, when processed by the LLM, cause the LLM to generate verification data that indicates: a value included in the query result, a corresponding source indicating a part of the input data from which the value was derived, and a corresponding evaluable expression comprising a code snippet in a computer-readable expression language for deriving the value from the source;

providing the prompt as input to the LLM;

receiving the query result and verification data generated by the LLM in response to the prompt; and processing the verification data to determine whether the query result was validly derived from the input data by:

instantiating an evaluation context by loading contextual data into memory, the contextual data comprising the indicated part of the input data;

executing or parsing the code snippet, based on the indicated part of the input data, in the computer-readable expression language to provide an expression output;

comparing the expression output to the value included in the query result; and in response to the expression output matching the value included in the query result, determining that the value was validly derived from the input data.

2. The method of claim 1, wherein automatically injecting the verification requested into the prompt comprises:

automatically selecting a stored verification request text from a plurality of stored verification request texts, based on the query.

3. The method of claim 1, wherein the input data is structured data.

4. The method of claim 1, wherein the prompt is a second prompt, the method further comprising, prior to generating the second prompt:

generating a first prompt for the LLM, the first prompt including the query; and providing the first prompt as input to the LLM to cause the LLM to generate the query result.

5. The method of claim 1, further comprising extracting the input data from a data store associated with a security system.

6. The method of claim 1, wherein the query text comprises instructions which, when processed by the LLM, cause the LLM to summarize the input data.

7. The method of claim 1, comprising:

executing or parsing the code snippet in an isolated computational environment.

8. The method of claim 1, comprising:

displaying, on a user interface, the query result; and highlighting the value included in the query result according to an output of the comparing the expression output to the value.

9. The method of claim 1, comprising:

in response to the expression output not matching the value included in the query result, generating a tagged query result including a tag indicating that the value is hallucinated;

generating a prompt including the tagged query result and instructions that, when processed by the LLM, cause the LLM to rewrite the query result with the value omitted;

inputting the prompt to the LLM; and receiving in response a rewritten query result omitting the value.

10. The method of claim 1, comprising:

in response to the expression output not matching the value included in the query result, generating a prompt including:

the query result;

the evaluable expression;

the value included in the query result;

an indication that the value could not be derived from the input data, and instructions that, when processed by the LLM, cause the LLM to generate a corrected query result.

11. A computer system for verifying a query result provided by a large language model, LLM, in response to a query including input data from which the query result was derived, the computer system comprising a processor and a memory, the memory storing instructions, which when executed by the processor, cause the system to:

automatically inject, into a prompt including query text and the input data, a verification request for the query result, wherein the verification request comprises instructions which, when processed by the LLM, cause the LLM to generate verification data that indicates: a value included in the query result, a corresponding source indicating a part of the input data from which the value was derived, and a corresponding evaluable expression comprising a code snippet in a computer-readable expression language for deriving the value from the source; and provide the prompt as input to the LLM;

receive the query result and verification data generated by the LLM in response to the prompt;

process the verification data to determine whether the query result was validly derived from the input data by:

instantiating an evaluation context by loading contextual data into memory, the contextual data comprising the indicated part of the input data;

executing or parsing the code snippet, based on the indicated part of the input data, in the computer-readable expression language to provide an expression output;

comparing the expression output to the value included in the query result; and in response to the expression output matching the value included in the query result determine that the value was validly derived from the input data.

12. The computer system of claim 11, wherein the input data is based on data extracted from a data store associated with a security system, and the query text comprises instructions which, when processed by the LLM, cause the LLM to summarize the input data.

* * * * *